US010687366B2

(12) United States Patent
Hui et al.

(10) Patent No.: US 10,687,366 B2
(45) Date of Patent: Jun. 16, 2020

(54) SSB TO RACH RESOURCE ASSOCIATIONS AND RELATED RACH CONFIGURATION CONTENTS IN MULTI-BEAM SYSTEM

(71) Applicant: ELECTRONICS AND TELECOMMUNICATIONS RESEARCH INSTITUTE, Daejeon (KR)

(72) Inventors: Bing Hui, Daejeon (KR); Il Gyu Kim, Chungcheongbuk-do (KR); Jun Hyeong Kim, Daejeon (KR); Go San Noh, Daejeon (KR); Hee Sang Chung, Daejeon (KR); Sung Woo Choi, Daejeon (KR)

(73) Assignee: ELECTRONICS AND TELCOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/128,568

(22) Filed: Sep. 12, 2018

(65) Prior Publication Data

US 2019/0104552 A1    Apr. 4, 2019

(30) Foreign Application Priority Data

Sep. 29, 2017 (KR) .................. 10-2017-0128272
Oct. 23, 2017 (KR) .................. 10-2017-0137503
Sep. 10, 2018 (KR) .................. 10-2018-0107504

(51) Int. Cl.
*H04W 74/08* (2009.01)
*H04W 56/00* (2009.01)
*H04W 48/10* (2009.01)
*H04W 72/04* (2009.01)
(Continued)

(52) U.S. Cl.
CPC ....... *H04W 74/0833* (2013.01); *H04W 48/10* (2013.01); *H04W 56/001* (2013.01); *H04W 72/046* (2013.01); *H04W 16/32* (2013.01); *H04W 48/16* (2013.01)

(58) Field of Classification Search
CPC .......... H04W 74/0833; H04W 56/001; H04W 48/10; H04W 72/046; H04W 16/32; H04W 48/16
See application file for complete search history.

(56) References Cited

U.S. PATENT DOCUMENTS

| 9,538,554 B2 | 1/2017 | Kim et al. |
| 9,641,230 B2 | 5/2017 | Park et al. |
| 2019/0230696 A1* | 7/2019 | Kim ............... H04W 72/12 |

FOREIGN PATENT DOCUMENTS

KR    10-2017-0085428 A    7/2017

OTHER PUBLICATIONS

"Remaining details on PRACH procedure", 3GPP TSG-RAN WG1#NR3, R1-1716138, Nagoya, Japan, Sep. 2017.

* cited by examiner

*Primary Examiner* — Walter J Divito
(74) *Attorney, Agent, or Firm* — LRK Patent Law Firm

(57) ABSTRACT

A method of performing, by a device, a random access procedure in a radio communication system includes: receiving from a base station RACH configuration information; and transmitting a first message based on the received RACH configuration information. Herein, a plurality of SSBs may be in association with a plurality of preambles, and the first message may be transmitted in a time domain through a plurality of RACH resources.

17 Claims, 23 Drawing Sheets

(51) Int. Cl.
*H04W 16/32* (2009.01)
*H04W 48/16* (2009.01)

FIG. 8 gNB Rx beam
sweeping timing

|     | Rx 1 | Rx 2 | Rx 3 | Rx 4 | Rx 5 | Rx 6 | Rx 7 | Rx 8 |
|-----|------|------|------|------|------|------|------|------|
| F5  | S0   | S1   | S2   | S3   | S4   | S5   | S6   | S7   |
| F4  | S0   | S1   | S2   | S3   | S4   | S5   | S6   | S7   |
| F3  | S0   | S1   | S2   | S3   | S4   | S5   | S6   | S7   |
| F2  | S0   | S1   | S2   | S3   | S4   | S5   | S6   | S7   |
| F1  | S0   | S1   | S2   | S3   | S4   | S5   | S6   | S7   |
| F0  | S0   | S1   | S2   | S3   | S4   | S5   | S6   | S7   |

\# ofTx = # ofRx at gNB
RACH resource for gNB Tx beam index reporting

FIG. 9

FIG. 10 gNB Rx beam
sweeping timing

|    | Rx 1  | Rx 2  | Rx 3  | Rx 4  | Rx 5  | Rx 6  | Rx 7  | Rx 8  |
|----|-------|-------|-------|-------|-------|-------|-------|-------|
| F5 | S7,S0 | S0,S1 | S1,S2 | S2,S3 | S3,S4 | S4,S5 | S5,S6 | S6,S7 |
| F4 | S7,S0 | S0,S1 | S1,S2 | S2,S3 | S3,S4 | S4,S5 | S5,S6 | S6,S7 |
| F3 | S7,S0 | S0,S1 | S1,S2 | S2,S3 | S3,S4 | S4,S5 | S5,S6 | S6,S7 |
| F2 | S7,S0 | S0,S1 | S1,S2 | S2,S3 | S3,S4 | S4,S5 | S5,S6 | S6,S7 |
| F1 | S7,S0 | S0,S1 | S1,S2 | S2,S3 | S3,S4 | S4,S5 | S5,S6 | S6,S7 |
| F0 | S7,S0 | S0,S1 | S1,S2 | S2,S3 | S3,S4 | S4,S5 | S5,S6 | S6,S7 | ofTx = # ofRx at gNB
Preamble sequence for gNB Tx beam index reporting

FIG. 11

| | gNB Rx beam sweeping timing | | | | | | gNB Rx beam sweeping timing | | |
|---|---|---|---|---|---|---|---|---|---|
| F5 | S0 | S0 | S1 | S2 | ... | S(M-2) | S(M-1) | S(M-1) | SM | ... |
| F4 | S0 | S0 | S1 | S2 | ... | S(M-2) | S(M-1) | S(M-1) | SM | ... |
| F3 | S0 | S0 | S1 | S2 | ... | S(M-2) | S(M-1) | S(M-1) | SM | ... |
| F2 | S0 | S0 | S1 | S2 | ... | S(M-2) | S(M-1) | S(M-1) | SM | ... |
| F1 | S0 | S0 | S1 | S2 | ... | S(M-2) | S(M-1) | S(M-1) | SM | ... |
| F0 | S0 | S0 | S1 | S2 | ... | S(M-2) | S(M-1) | S(M-1) | SM | ... |

\# ofTx > # ofRx at gNB
RACH resource for gNB Tx beam index reporting

FIG. 13

|    |       |    |    |    |     |        |        |        |    |     |
|----|-------|----|----|----|-----|--------|--------|--------|----|-----|
| F5 | S0    | S0 | S1 | S1 | ... | S(M-2) | S(M-1) | S(M-1) | SM | ... |
| F4 | S0    | S0 | S1 | S1 | ... | S(M-2) | S(M-1) | S(M-1) | SM | ... |
| F3 | S0    | S0 | S1 | S1 | ... | S(M-2) | S(M-1) | S(M-1) | SM | ... |
| F2 | S0    | S0 | S1 | S1 | ... | S(M-2) | S(M-1) | S(M-1) | SM | ... |
| F1 | S0    | S0 | S1 | S1 | ... | S(M-2) | S(M-1) | S(M-1) | SM | ... |
| F0 | S0    | S0 | S1 | S1 | ... | S(M-2) | S(M-1) | S(M-1) | SM | ... | gNB Rx beam sweeping timing (columns 1 and column S(M-1))

\# ofTx > # ofRx at gNB
RACH resource for gNB Tx beam index reporting

FIG. 14 gNB Rx beam sweeping timing

| | | | | | | | | |
|---|---|---|---|---|---|---|---|---|
| F5 | S(M-1) | S0 | S0 | ... | S0 | S0 | S1 | S1 | ... |
| F4 | S(M-1) | S0 | S0 | ... | S0 | S0 | S1 | S1 | ... |
| F3 | S(M-1) | S0 | S0 | ... | S0 | S0 | S1 | S1 | ... |
| F2 | S(M-1) | S0 | S0 | ... | S0 | S0 | S1 | S1 | ... |
| F1 | S(M-1) | S0 | S0 | ... | S0 | S0 | S1 | S1 | ... |
| F0 | S(M-1) | S0 | S0 | ... | S0 | S0 | S1 | S1 | ... |

\# ofTx < # ofRx at gNB
RACH resource for gNB Tx beam index reporting

FIG. 15

| | gNB Rx beam sweeping timing | | | | | | | | |
|---|---|---|---|---|---|---|---|---|---|
| F5 | S(M-1),S0 | S0 | S0 | ... | S0 | S0,S1 | S1 | S1 | ... |
| F4 | S(M-1),S0 | S0 | S0 | ... | S0 | S0,S1 | S1 | S1 | ... |
| F3 | S(M-1),S0 | S0 | S0 | ... | S0 | S0,S1 | S1 | S1 | ... |
| F2 | S(M-1),S0 | S0 | S0 | ... | S0 | S0,S1 | S1 | S1 | ... |
| F1 | S(M-1),S0 | S0 | S0 | ... | S0 | S0,S1 | S1 | S1 | ... |
| F0 | S(M-1),S0 | S0 | S0 | ... | S0 | S0,S1 | S1 | S1 | ... |

\# ofTx < # ofRx at gNB
Preamble sequence for gNB Tx beam index reporting

FIG. 16

| | | | | | | | | | |
|---|---|---|---|---|---|---|---|---|---|
| F5 | L3 | S17 | S17 | S19 | S19 | S21 | S21 | S23 | S23 |
| F4 | S16 | S16 | S18 | S18 | S20 | S20 | S22 | S22 | |
| F3 | L2 | S9 | S9 | S11 | S11 | S13 | S13 | S15 | S15 |
| F2 | S8 | S8 | S10 | S10 | S12 | S12 | S14 | S14 | |
| F1 | L1 | S1 | S1 | S3 | S3 | S5 | S5 | S7 | S7 |
| F0 | S0 | S0 | S2 | S2 | S4 | S4 | S6 | S6 | |

\# ofTx >= # ofRx at gNB
RACH resource for gNB Tx beam index reporting

FIG. 17

| | | | | | | | | |
|---|---|---|---|---|---|---|---|---|
| F5 | S23 | S17 | S17 | S19 | S19 | S21 | S21 | S23 |
| F4 | S16 | S16 | S18 | S18 | S20 | S20 | S22 | S22 |
| F3 | S15 | S9 | S9 | S11 | S11 | S13 | S13 | S15 |
| F2 | S8 | S8 | S10 | S10 | S12 | S12 | S14 | S14 |
| F1 | S7 | S1 | S1 | S3 | S3 | S5 | S5 | S7 |
| F0 | S0 | S0 | S2 | S2 | S4 | S4 | S6 | S6 |

\# ofTx >= # ofRx at gNB
RACH resource for gNB Tx beam index reporting

FIG. 18

| | | | | | | | | |
|---|---|---|---|---|---|---|---|---|
| F5 | S15 | S17 | S17 | S19 | S19 | S21 | S21 | S23 |
| F4 | S16 | S16 | S18 | S18 | S20 | S20 | S22 | S22 |
| F3 | S7 | S9 | S9 | S11 | S11 | S13 | S13 | S15 |
| F2 | S8 | S8 | S10 | S10 | S12 | S12 | S14 | S14 |
| F1 | S23 | S1 | S1 | S3 | S3 | S5 | S5 | S7 |
| F0 | S0 | S0 | S2 | S2 | S4 | S4 | S6 | S6 | ofTx >= # ofRx at gNB
RACH resource for gNB Tx beam index reporting

FIG. 19

| | | | | | | | | | | | | | | | | | | | | | | |
|---|---|---|---|---|---|---|---|---|---|---|---|---|---|---|---|---|---|---|---|---|---|---|
| | | | | | | | | | | | | | | | | | | | | S43 | | S21 | |
| | | | | | | | | | | | | | | | | | | S43 | S42 | S21 | S20 |
| | | | | | | | | | | | | | | S63 | | S41 | S42 | S19 | S20 |
| | | | | | | | | | | | | | S63 | S62 | S41 | S40 | S19 | S18 |
| | | | | | | | | | | | | S61 | S62 | S39 | S40 | S17 | S18 |
| | | | | | | | | | | | S61 | S60 | S39 | S38 | S17 | S16 |
| | | | | | | | | | | S59 | S60 | S37 | S38 | S15 | S16 |
| | | | | | | | | | S59 | S58 | S37 | S36 | S15 | S14 |
| | | | | | | | | S57 | S58 | S35 | S36 | S13 | S14 |
| | | | | | | | S57 | S56 | S35 | S34 | S13 | S12 |
| | | | | | | S55 | S56 | S33 | S34 | S11 | S12 |
| | | | | | S55 | S54 | S33 | S32 | S11 | S10 |
| | | | | S53 | S54 | S31 | S32 | S9 | S10 |
| | | | S53 | S52 | S31 | S30 | S9 | S8 |
| | | | S51 | S52 | S29 | S30 | S7 | S8 |
| | | S51 | S50 | S29 | S28 | S7 | S6 |
| S49 | S50 | S27 | S28 | S5 | S6 |
| S49 | S48 | S27 | S26 | S5 | S4 |
| S47 | S48 | S25 | S26 | S3 | S4 |
| S47 | S46 | S25 | S24 | S3 | S2 |
| S45 | S46 | S23 | S24 | S1 | S2 |
| S45 | S44 | S23 | S22 | S1 | S0 |
| L3 | S44 | L2 | S22 | L1 | S0 |
| F5 | F4 | F3 | F2 | F1 | F0 | of Tx >= # of Rx at gNB
RACH resource for gNB Tx beam index reporting

FIG. 20 gNB Rx beam
sweeping timing

| FB | S(M-1) |    |    |    |    | S1 | S1 | ... | S1 |
|----|--------|----|----|----|----|----|----|-----|----|
|    |        |    |    |    |    |    |    |     |    |
| FA | S0     | S0 | S0 | ...| S0 | S0 |    |     |    | ofTx < # ofRx at gNB
RACH resource for gNB Tx beam index reporting

FIG. 21

| | | | | | | | | | |
|---|---|---|---|---|---|---|---|---|---|
| FC | S(M-1) | S0 | S0 | ... | S0 | S1 | S1 | ... | S1 |
| FB | | | | | | | S1 | ... | S1 |
| FA | S0 | S0 | S0 | ... | S0 | S0 | | | | gNB Rx beam sweeping timing

\# ofTx < # ofRx at gNB
RACH resource for gNB Tx beam index reporting

SSB TO RACH RESOURCE ASSOCIATIONS AND RELATED RACH CONFIGURATION CONTENTS IN MULTI-BEAM SYSTEM

CROSS REFERENCE TO RELATED APPLICATIONS

The present application claims priority to Korean Patent Application No. 10-2017-0128272, filed Sep. 29, 2017, No. 10-2017-0137503, filed Oct. 23, 2017, and No. 10-2018-0107504, filed Sep. 10, 2018, respectively, the entire content of which is incorporated herein for all purposes by this reference.

BACKGROUND OF THE INVENTION

1. Field of the Invention

The present disclosure includes random access channel (RACH) resource configuration methods for user equipment (UE) to transmit its message (Msg.) 1 during a random access (RA) procedure in a multi-beam system.

Furthermore, the present disclosure proposes several synchronization signal block (SSB) to RACH resource associations for both sub-6 GHz and above 6 GHz carrier frequency cases. The present disclosures are applicable to future 5th generation (5G) communication systems such as a 3GPP new radio (NR) system. In this patent, for convenience, the 3GPP NR system has been taken as a baseline to describe the present disclosure.

2. Description of Related Art

Recently, through a program named as "IMT for 2020 and beyond", discussion for 5G communication has been conducted. Herein, 3rd generation partnership project (3GPP) new radio (NR) systems support various numerologies of a time-frequency resource unit in consideration of various scenarios, service requirements, potential system compatibility, etc.

Herein, in one embodiment, a method of setting a resource in consideration of a first random access message has been discussed on the basis of 5G requirements.

SUMMARY OF THE INVENTION

An object of the present disclosure is to provide a method of RACH setting and SSB to PRACH resource association in a multi-beam system.

Another object of the present disclosure is to provide a method of solving an overlapping problem of a Tx beam and an Rx beam due to beam mismatching in a base station.

Still another object of the present disclosure is to provide flexibility to a base station for Rx beam switching.

Still another object of the present disclosure is to provide usage of an identical mapping method for an independent Rx beam of a base station.

Still another object of the present disclosure is to provide remaining minimum system information (RMSI) for RACH setting.

Still another object of the present disclosure is to provide a method of reducing signaling overhead.

Still another object of the present disclosure is to provide a method of reducing a delay occurring on the basis of a degree-of-freedom of a frequency domain.

Still another object of the present disclosure is to provide a method of not dividing a sequence into groups for SSBs different from each other.

Still another object of the present disclosure is to provide diversity of a preamble in a frequency domain when a beam is positioned at a boundary where a number of Tx beams is smaller than a number of Rx beams as "above 6 GHz".

Technical problems obtainable from the present disclosure are not limited by the above-mentioned technical problems, and other unmentioned technical problems may be clearly understood from the following description by those having ordinary skill in the technical field to which the present disclosure pertains.

According to the present disclosure, there is provided a method of setting RACH and SSB to PRACH resource association in a multi-beam system.

According to the present disclosure, there is provided a method of solving an overlapping problem of a Tx beam and an Rx beam due to beam mismatching in a base station.

According to the present disclosure, flexibility can be provided to a base station for Rx beam switching.

According to the present disclosure, the same mapping can be used for an independent Rx beam of a base station.

According to the present disclosure, remaining minimum system information (RMSI) for RACH setting can be provided.

According to the present disclosure, there is provided a method of reducing signaling overhead.

According to the present disclosure, there is provided a method of reducing a delay occurring on the basis of degree-of-freedom of a frequency domain.

According to the present disclosure, there is provided a method of not dividing a sequence into groups for SSBs different from each other.

According to the present disclosure, diversity of a preamble in a frequency domain can be provided when a beam is positioned at a boundary where a number of Tx beams is smaller than a number of Rx beams as "above 6 GHz".

According to an embodiment of the present invention, there is provided a method of performing a random access procedure, wherein a device performs a random access procedure in a radio communication system, the method comprising: receiving random access channel (RACH) configuration information from a base station; and transmitting a first message to the base station based on the received RACH configuration information, wherein a plurality of synchronization signal blocks (SSB) is respectively in association with a plurality of preambles, and the first message is transmitted in a time domain through a plurality of RACH resources.

Also, according to an embodiment of the present invention, there is provided a method of performing a random access procedure, wherein a base station performs a random access procedure in a radio communication system, the method comprising: determining information to be included in RACH configuration information in consideration of an SSB and RACH resource association relation; transmitting the RACH configuration information to a device; and receiving from the device a first message based on the RACH configuration information, wherein a plurality of SSBs is respectively in association with a plurality of preambles, and the first message is received in a time domain through a plurality of RACH resources.

Also, according to an embodiment of the present invention, there is provided a device for performing a random access procedure, wherein the device performs a random access procedure in a radio communication system, the device comprising: a transmitting unit, a receiving unit, and a processor controlling the transmitting unit and the receiving unit, wherein the processor receives RACH configuration information from a base station through the receiving unit, and transmits to the base station a first message based on the received RACH configuration information, wherein a plurality of SSBs is respectively in association with a plurality of preambles, and the first message is transmitted in a time domain through a plurality of RACH resources.

Also, according to an embodiment of the present invention, there is provided a base station, wherein the base station performs a random access procedure in a radio communication system, the base station comprising: a transmitting unit, a receiving unit, and a processor controlling the transmitting unit and the receiving unit, wherein the processor determines information to be included in RACH configuration information in consideration of an SSB and RACH resource association relation, transmits to a device the RACH configuration information through the transmitting unit, and receives from the device a first message based on the RACH configuration information, wherein a plurality of SSBs is respectively in association with a plurality of preambles, and the first message is received in a time domain through a plurality of RACH resources.

Also, the following embodiments may apply to a method of performing the random access procedure, the device and the base station therefor in common.

According to an embodiment of the present invention, all of the plurality of preambles in association with the plurality of SSBs are identical, and the plurality of SSBs is identified based on a position of the respective RACH resources.

According to an embodiment of the present invention, when a number of Tx beams and a number of Rx beams of the base station are identical, the first message in association with one SSB is transmitted in two consecutive RACH resources.

According to an embodiment of the present invention, when a number of Tx beams of the base station is larger than a number of Rx beams, the first message in association with a boundary Tx beam is transmitted in two consecutive RACH resources, and the first message in association with non-boundary Tx beam is transmitted in one RACH resource.

According to an embodiment of the present invention, when a number of Tx beams of the base station is smaller than a number of Rx beams, a beam sweeping timing of a boundary Rx beam and a beam sweeping timing of non-boundary Rx beam are differently set.

According to an embodiment of the present invention, the plurality of SSBs is respectively in association with preambles different from each other, and the plurality of SSBs is respectively identified based on the preambles.

According to an embodiment of the present invention, when a number of Tx beams and a number of Rx beams of the base station are identical, the first message including the plurality of preambles respectively in association with the plurality of SSBs is transmitted in one RACH resource.

According to an embodiment of the present invention, when a number of Tx beams of the base station is larger than a number of Rx beams, the first message including the plurality of preambles respectively in association with the plurality of SSBs is transmitted in one RACH resource, the first message of an SSB in association with a boundary Tx beam is transmitted in two consecutive RACH resources, and the first message of an SSB in association with non-boundary Tx beam is transmitted in one RACH resource.

According to an embodiment of the present invention, when a number of Tx beams of the base station is smaller than a number of Rx beams, the first message in association with an SSB monitored by a boundary Rx beam is transmitted in two consecutive RACH resources.

According to an embodiment of the present invention, the random access procedure is applied to a frequency smaller than 6 GHz.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The above and other objects, features and other advantages of the present disclosure will be more clearly understood from the following detailed description when taken in conjunction with the accompanying drawings, in which:

FIG. 8 is a view showing RACH resource mapping when a number of Tx beams and a number of Rx beams are identical;
FIG. 9 is a view showing RACH resource mapping when a number of Tx beams and a number of Rx beams are identical;
FIG. 10 is a view showing RACH resource mapping when a number of Tx beams and a number of Rx beams are identical;
FIG. 11 is a view showing RACH resource mapping when a number of Tx beams is larger than a number of Rx beams;
FIG. 13 is a view showing RACH resource mapping when a number of Tx beams is larger than a number of Rx beams;
FIG. 14 is a view showing RACH resource mapping when a number of Tx beams is smaller than a number of Rx beams;
FIG. 15 is a view showing RACH resource mapping when a number of Tx beams is smaller than a number of Rx beams;
FIG. 16 is a view showing RACH resource mapping when a number of Tx beams is larger than a number of Rx beams;
FIG. 17 is a view showing RACH resource mapping when a number of Tx beams is larger than a number of Rx beams;
FIG. 18 is a view showing RACH resource mapping when a number of Tx beams is larger than a number of Rx beams;
FIG. 19 is a view showing RACH resource mapping when a number of Tx beams and a number of Rx beams are identical;
FIG. 20 is a view showing RACH resource mapping when a number of Tx beams are smaller than a number of Rx beams;

FIG. 21 is a view showing RACH resource mapping when a number of Tx beams is smaller than a number of Rx beams;

DETAILED DESCRIPTION OF THE INVENTION

Figure 1:
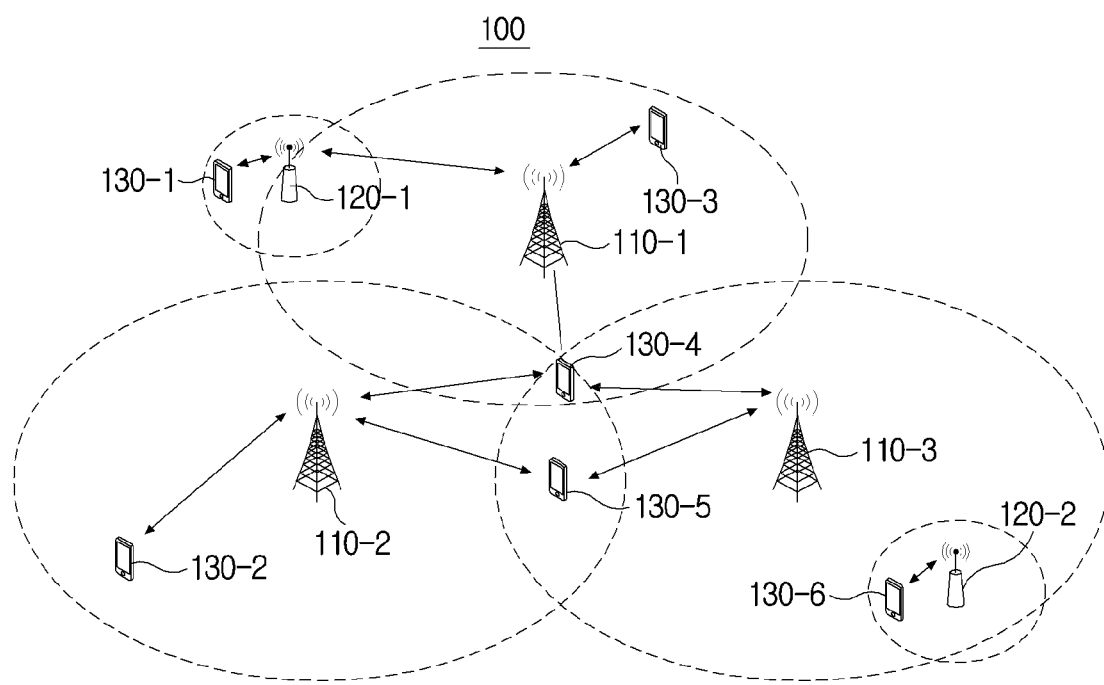
FIG. 1 is a view showing a communication system.

Exemplary embodiments of the present disclosure will now be described with reference to the accompanying drawings. Herein, like components will be denoted by like reference numerals throughout the specification and the drawings. Elaboration of functions or features apparent to a person having ordinary knowledge in the art will be omitted herein for clarity of description of the present disclosure.

Detailed description of well-known functions and structures incorporated herein may be omitted to avoid obscuring the subject matter of the present disclosure. In addition, only components related to the embodiment are shown in drawings for the clarity of explanation and the similar reference numerals will be assigned to the similar elements throughout the specification.

When a component is mentioned as being "connected" to or "accessing" another component, this may mean that it is directly connected to or accessing the other component, but it is to be understood that there are no intervening components present. In addition, when one part "includes" or "has" one constituent element in the present specification, unless otherwise specifically described, this does not mean that another constituent element is excluded, but means that another constituent element may be further included. Although the terms first and/or second, etc. may be used herein to describe various elements, these elements should not be limited by these terms. These terms are only used to distinguish one element from another. For example, a first element could be termed a second element, and, similarly, a second element could be termed a first element, without departing from the scope of example. In the present disclosure, the components that are distinguished from each other are for clearly explaining their respective features, and do not mean that the components are necessarily separated. That is, a plurality of components may be integrated in units of one piece of hardware or software, and one component may be distributed and performed in units of a plurality of hardware or software. Thus, even if not stated otherwise, such integrated or dispersed embodiments are included within the scope of the present invention.

Some constituents are not essential to the substantial functions in the disclosure and may be optional constituents for merely improving performance. The disclosure may be embodied to include only constituents essential to embodiment of the disclosure, except for the constituents used to merely improve performance. The structure including only the essential constituents except for the optical constituents used to merely improve performance belongs to the scope of the disclosure.

FIG. 1 is a view showing a communication system.

A communication system 100 may include a plurality of communication nodes 110-1, 110-2, 110-3, 120-1, 120-2, 130-1, 130-2, 130-3, 130-4, 130-5, and 130-6. Herein, the communication system may be named as "communication network". Each of the plurality of communication nodes may support at least one communication protocol. In one embodiment, each of the plurality of communication nodes may support a communication protocol based on code division multiple access (CDMA), a communication protocol based on wideband CDMA (WCDMA), a communication protocol based on time division multiple access (TDMA), a communication protocol based on frequency division multiple access (FDMA), a communication protocol based on orthogonal frequency division multiplexing (OFDM), a communication protocol based on orthogonal frequency division multiple access (OFDMA), a communication protocol based on single carrier (SC)-FDMA, a communication protocol based on non-orthogonal multiple access (NOMA), a communication protocol based on space division multiple access (SDMA), etc. Each of the plurality of communication nodes may have a configuration below, and is not limited to the above embodiment.

In addition, in one embodiment, description in below will be made on the basis of a data transmission and reception relation between a base station and a mobile station. Herein, the base station may be a terminal node of a network performing direct communication with the mobile station. In addition, specific operation performed by the base station may be performed by an upper node of the base station when necessary. In other words, in a network configured with a plurality of network nodes including the base station, various operations performed for performing communication with the mobile station is named as operations of the base station.

Herein, the base station may be a Node B, an eNode B, a gNode B, etc. In below, for convenience of description, it is named as a base station.

In addition, a "mobile station (MS)" may be user equipment (UE), a mobile terminal, a station, etc. In below, for convenience of description, it is named as a base station.

In addition, in an uplink, a mobile station may become a transmitter, and a base station may become a receiver, and in a downlink, the mobile station may become a receiver, and the base station may become a transmitter.

In addition, description that a device performs communication with a "cell" may mean that the device transmits and receives a signal to/from a base station of the corresponding cell. In other words, a practical target to/from which the device transmits and receives a signal may be a specific base station. For convenience of description, description may be made in that signal transmission and reception are performed with a cell formed in a specific base station. Similarly, "macro cell" or "small cell" or both may respectively mean specific coverage. In addition, "macro cell" or "small cell" or both may mean a "macro base station supporting a macro cell" or a "small base station supporting a small cell" or both.

Embodiments of the present disclosure may be supported by at least one of standard documents of an IEEE 802.xx system, a 3GPP system, a 3GPP LTE system, and a 3GPP2 system which are radio access systems. In other words, steps or parts, which are not described in the embodiments of the present disclosure to prevent obscuring the technical spirit of the present disclosure, may be supported by the above documents. Herein, Referring to FIG. 1, the communication system 100 may include a plurality of base stations 110-1, 110-2, 110-3, 120-1, and 120-2, and a plurality of devices (user equipment) 130-1, 130-2, 130-3, 130-4, 130-5, and 130-6. The first base station 110-1, the second base station 110-2, and the third base station 110-3 may respectively form a macro cell. The fourth base station 120-1 and the fifth base station 120-2 may respectively form a small cell. In coverage of the first base station 110-1, the fourth base station 120-1, the third device 130-3, and the fourth device 130-4 may belong. In coverage of the second base station 110-2, the second device 130-2, the fourth device 130-4, and the fifth device 130-5 may belong. In coverage of the third base station 110-3, the fifth base station 120-2, the fourth device 130-4, the fifth device 130-5, and the sixth device 130-6 may belong. In coverage of the fourth base station 120-1, the first device 130-1 may belong. In coverage of the fifth base station 120-2, the sixth device 130-6 may belong.

Herein, the plurality of base stations 110-1, 110-2, 110-3, 120-1, and 120-2 may be respectively named as a NodeB, an evolved NodeB, a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (IP), a transmission and reception point (TRP), a relay node, etc. The plurality of devices 130-1, 130-2, 130-3, 130-4, 130-5, and may be respectively named as a terminal, an access terminal, a mobile terminal, a station, a subscriber station, a mobile station, a portable subscriber station, a node, user equipment, etc.

The plurality of communication nodes 110-1, 110-2, 110-3, 120-1, 120-2, 130-1, 130-2, 130-3, 130-4, 130-5, and 130-6 may support long term evolution (LTE), LTE-A (advanced), etc. which are described in cellular communication standard (for example, 3rd generation partnership project (3GPP). The plurality of base stations 110-1, 110-2, 110-3, 120-1, and 120-2 may operate in frequency bands different from each other, or in the same frequency band. The plurality of base stations 110-1, 110-2, 110-3, 120-1, and 120-2 may be connected with each other by ideal backhaul or non-ideal backhaul, or exchange information with each other by ideal backhaul or non-ideal backhaul. The plurality of base stations 110-1, 110-2, 110-3, 120-1, and 120-2 may be respectively connected to a core network (not shown) by ideal backhaul or non-ideal backhaul. The plurality of base stations 110-1, 110-2, 110-3, 120-1, and 120-2 may respectively transmit a signal received from the core network to the devices 130-1, 130-2, 130-3, 130-4, 130-5, and 130-6, and may respectively transmit a signal received from the corresponding devices 130-1, 130-2, 130-3, 130-4, 130-5, and 130-6 to the core network.

The plurality of base stations 110-1, 110-2, 110-3, 120-1, and 120-2 may respectively support downlink transmission based on OFDMA, or uplink transmission based on SC-FDMA. In addition, the plurality of base stations 110-1, 110-2, 110-3, 120-1, and 120-2 may respectively support a multiple input multiple output (MIMO) transmission (for example, single user (SU)-MIMO, multi user (MLT)-MIMO, massive MIMO, etc), a coordinated multipoint (CoMP) transmission, a carrier aggregation transmission, a transmission in an unlicensed band, a device to device (D2D) communication (or, proximity services (ProSe), etc. Herein, the plurality of devices 130-1, 130-2, 130-3, 130-4, 130-5, and 130-6 may respectively perform operation in association with the base stations 110-1, 110-2, 110-3, 120-1, and 120-2, and perform operations supported by the base stations 110-1, 110-2, 110-3, 120-1, and 120-2.

For example, the second base station 110-2 may transmit to the fourth device 130-4 a signal on the basis of a SU-MIMO method, and the fourth device 130-4 may receive from the second base station 110-2 a signal on the basis of a SU-MIMO method. Alternatively, the second base station 110-2 may transmit to the fourth device 130-4 and the fifth device 130-5 a signal on the basis of a MU-MIMO, and the fourth device 130-4 and the fifth device 130-5 may respectively receive from the second base station a signal on the basis of a MU-MIMO method. The first base station 110-1, the second base station 110-2, and the third base station 110-3 may respectively transmit to the fourth device 130-4 a signal on the basis of a CoMP method, and the fourth device 130-4 may receive from the first base station 110-1, the second base station 110-2, and the third base station 110-3 a signal on the basis of a CoMP method. The plurality of base stations 110-1, 110-2, 110-3, 120-1, and 120-2 may respectively transmit and receive a signal to/from the devices 130-1, 130-2, 130-3, 130-4, 130-5, and 130-6 which belong to each coverage on the basis of a CA method. The first base station 110-1, the second base station 110-2, and the third base station 110-3 may respectively perform coordination for D2D communication between the fourth device 130-4 and the fifth device 130-5, and the fourth device 130-4 and the fifth device 130-5 may respectively perform D2D communication by coordination of the respective second base station 110-2 and the third base station 110-3.

Next, random access techniques in a radio communication system will be described. Herein, although a method performed in a first communication node among communication nodes (for example, transmission or reception of a signal) is described, a second communication node in association with the first communication node may perform a method in association with the method performed by the first communication node (for example, transmission or reception of a signal).

In other words, when operation of a device is described, a base station in association with the device may perform operation in association with the operation of the device. Alternatively, when operation of the base station is described, the device in association with the base station may perform operation in association with the operation of the base station.

A transport channel in an upper layer of a physical layer used during a random access procedure in 3GPP LTE and LTE-A is names as a random access channel (hereinafter, referred as "RACH"), and physical channel of an RACH mapped to a physical layer as a radio resource that is directly assigned to a time domain and a frequency domain is named as a physical random access channel (hereinafter, refereed as "PRACH"). The RACH may be used as an uplink control channel for transmitting, by a device, a random access preamble to a base station during a random access procedure performing, by the device, initial timing synchronization with the base station and power control, uplink resource request, handover, etc. so as to access to the base station.

In a random access procedure, initialization is performed by the base station, and the device transmits a random access preamble to the base station. Then, the base station transmits to the device a random access response in response to the random access preamble. Then, the device and the base station may establish a radio link by transmitting and receiving an uplink data channel including signaling information such as UL-SCH (uplink shared channel) and a downlink data channel such as DL-SCH (downlink shared channel) so that requirements of the device are satisfied.

When random access preambles transmitted by a plurality of devices to the base station collide with each other when the plurality of devices attempts random access to the base station, and thus a random access procedure may not be performed smoothly. In order to reduce such a collision occurrence probability, in a mobile communication system such as LTE, random access opportunity of devices may increase by increasing a number of slots (or subframes) to which random access is available in a time domain, or by ensuring a number of radio resources for a random access channel in a frequency domain. By using random access multi-channel operation, collision probability between random access preambles transmitted from a plurality of device may be reduced, and an access delay time to the base station in the device may be reduced by the same.

Figure 2:
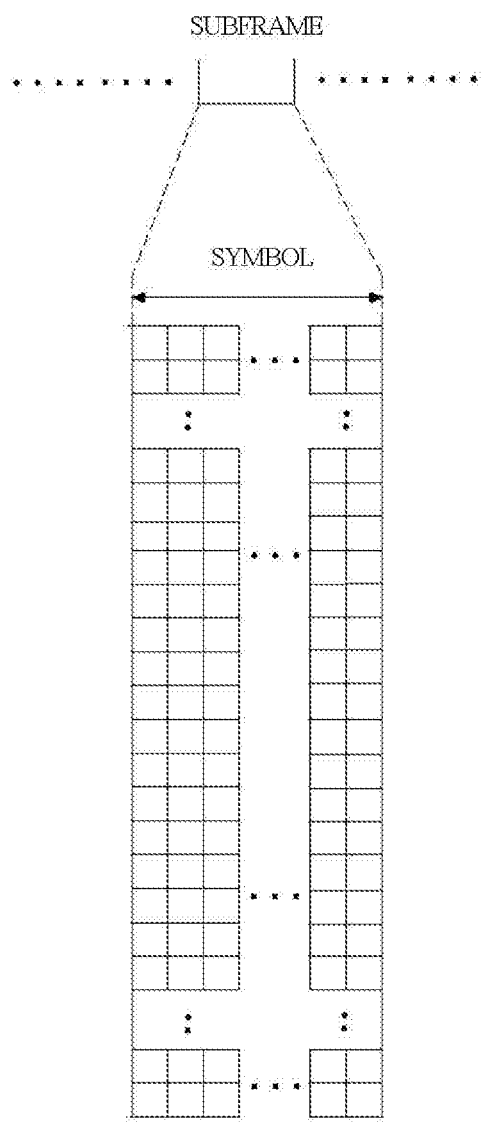
FIG. 2 is a view showing a configuration of a frame.

FIG. 2 is a view showing a configuration of a frame.

Referring to FIG. 2, one resource block may be configured with twelve resource elements in a frequency domain. Herein, in one embodiment, numerologies may be variably configured so as to satisfy various services and requirements of an NR system. In one embodiment, numerologies may be defined on the basis of subcarrier spacing (SCS) used in an OFDM system, a CP length, a number of OFDM symbols per slot, etc.

In addition, in one embodiment, in an NR system, 14 OFDM symbols may be fundamentally configured in association with a normal slot. Herein, the normal slot may be a basis time unit used when transmitting data and control information. In addition, in one embodiment, different to a slot, a subframe may have an absolute time length in an NR system which corresponds to 1 ms, and may be used as a reference time for a length of another temporal section. Herein, for coexistence or backward compatibility of LTE and an NR system, a temporal section of LTE such as subframe may be required in NR standard. In one embodiment, in LTE, data may be transmitted on the basis of a transmission time interval (TTI) that is a time unit, the TTI may be configured with at least one subframe unit. Herein, in LTE, one subframe may be set to 1 ms, and 14 OFDM symbols (or 12 OFDM symbols) may be included.

In below, a power ramping procedure in consideration of the environment describe above will be described.

3GPP work items (WI) for NR aim realize an NR system fulfilling 5G requirements. In 3GPP NR, multi-beam operations based on hybrid beamforming are adopted to enhance the system performance. In order to enable multi-beam operations, RACH and RA procedures including Msg. designs need to be well considered.

The agreed contents related to synchronization signals (SS) and physical random access channel (PRACH) design can be found in reference 1-5.

Reference 1 3GPP TR 38.802, "Study on New Radio (NR) Access Technology; Physical Layer Aspects," Rel. 14, February 2017.

Reference 2 3GPP Chairman's notes, RAN1#89, May 2017.s

Reference 3 3GPP Chairman's notes, RAN1-NR #2, June 2017.

Reference 4 3GPP Chairman's notes, RAN1#90, August 2017.

Reference 5 3GPP Chairman's notes, RAN1-NR #3, September 2017.

Figure 3:
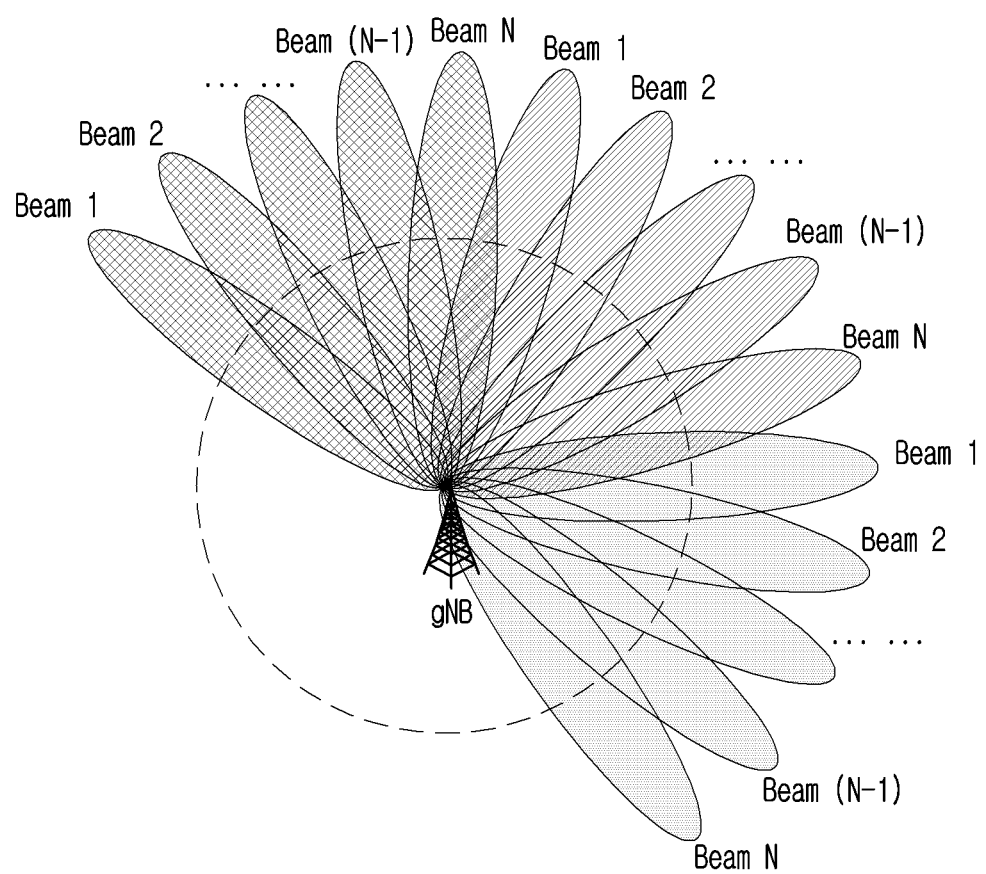
FIG. 3 is a view showing a multi-beam configuration.
Figure 4:
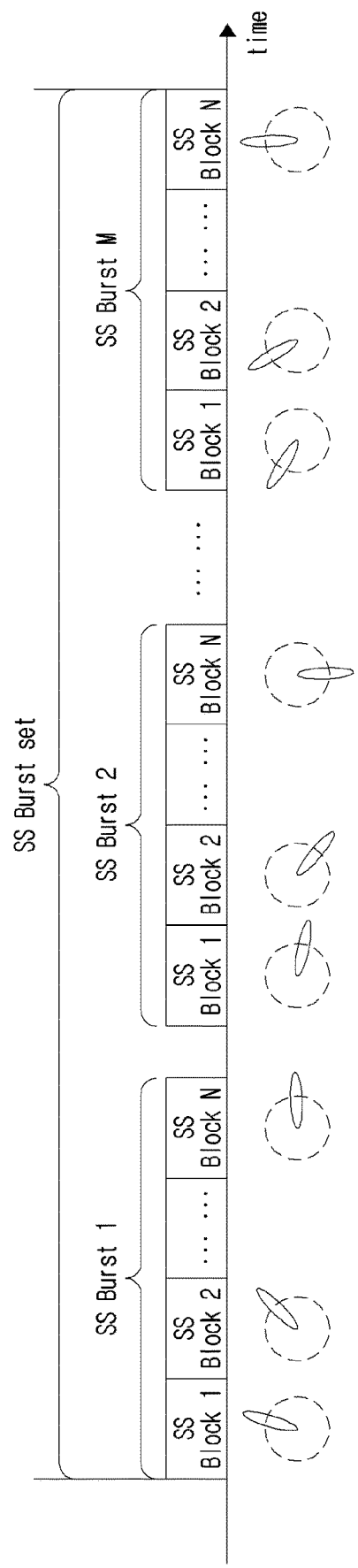
FIG. 4 is a view showing a configuration of a SSB burst set.

FIG. 3 shows an example of multi-beam transmitter (Tx) at gNB (base station in NR), assuming that all the gNB Tx beams are grouped and there are N beams in each group. Correspondingly, it can be understand that the NR SSB structure is as shown in FIG. 2. Since beam sweeping is based on analog beamforming, an SS burst set is designed to contain several SS burst in time domain. As shown in FIG. 1, each SS burst can be considered corresponding to a beam group. Furthermore in each SS burst, several SS blocks are located corresponding to different beams within a beam group. Note that as shown in FIG. 4, one SS burst set may contain one or multiple SS burst and one SS bursts may contain one or multiple SS blocks. By defining in this way, FIG. 4 can be considered as the joint SS structure that is suitable for both single-beam and multi-beam operations.

For supporting gNB receiver (Rx) beam sweeping when receiving Msg. 1 from a UE, multiple time-domain RACH resources might be needed by a UE to send its Msg. 1. In this patent, a RACH resource indicates a set of time/frequency resources in which a preamble format (which only contains one preamble sequence), or one of multiple preamble sequences of a preamble format (which contains multiple preamble sequences) can be transmitted based on different preamble formats and different implementations. In another word, using the terminology defined by NR in reference 1-5, a RACH resource can include a complete or partial RACH transmission occasion in the time domain. In the frequency domain, the length and location of a RACH resource is same as those of a RACH transmission occasion. A RACH resource in this patent is considered to correspond to one Rx beam direction at gNB. At the gNB side, the gNB may receive one or multiple preambles from a UE in one RACH resource due to gnB Rx beam sweeping. By doing this, gNB can determine an optimal Rx beam direction to a specific UE.

If beam correspondence at the gNB side does not exist, UE needs to report the optimal downlink Tx beam to the gNB through its Msg. 1. The association between SSBs and RACH resources/preamble indices can be used for beam index reporting. In this patent, proposed are several RACH resource configuration methods and a corresponding SSB to RACH resource/preamble indices associations to enable this index reporting mechanism. Note that the described designs are not only applicable for 3GPP NR system but also for future 5G systems.

<Notation>

All through this patent, "#" is short for "number" in the figures. "FX" indicates the frequency allocation for the x-th RACH resource which may occupy one or multiple physical resource blocks (PRBs) in the frequency domain. In the figures, the x-th SSB is represented as "SX". "LX" indicates the location of the x-th candidate RACH resource. Furthermore, the beam directions in FIGS. 5, 6 and 7 only indicate the relationship of directions between and Rx beams, but not coverages or gains of those beams.

All through this patent, it is assumed that gNB Tx beam sweeping starts from Tx beam 1, and Rx beam sweeping starts from Rx beam 1. From Tx beam 1 to Tx beam M, SSB 0 to SSB(M-1) are transmitted correspondingly $N_{TX}$ is the number of Tx beams at gNB, and $N_{RX}$ is the number of Rx beams at gNB. If a Tx beam's coverage is crossing two adjacent Rx beam's coverage, we name this Tx beam as boundary Tx beam. Similarly if an Rx bean's coverage is crossing two adjacent Tx beam's coverage, this Rx beam is named as boundary Rx beam. For example, Tx beam 1 and Tx beam M are boundary Tx beams in FIG. 6, and Rx beam 1 and Rx beam M are boundary Rx beams in FIG. 7. A Tx-Rx mismatching problem at gNB in this patent was named as the scenario of that gNB Tx beam directions and Rx beam directions are not same (or mismatched).

Note that the figures in this patent mean the RACH resource locations in a practical system. In a practical system, the available RACH resources can be distributed in the time domain and/or the frequency domain. In this patent, all the available RACH resources were taken out the SSB to RACH resource association mappings without drawing the time/frequency gap among these available RACH resources were proposed. Also, due to practical network implementation, the overlapped RACH resources in time domain for a boundary beam, can be 0, one or more than one. In this patent, we take the value of one as an example for description.

First embodiment (case where a carrier frequency is smaller than 6 GHz, and SSB to RACH resource association and RACH setting contents related to the same)

Embodiment 1-1 (When $N_{TX}=N_{RX}$)

Based on the above description, abase station may consider a case where a number of Tx beams and a number of Rx beams are identical. In other words, a case of $N_{TX}=N_{RX}$ may be considered. In one embodiment, referring to FIG. 5, in case where a carrier frequency is smaller than 6 GHz, in terms of the base station, multi-beam directions for all of Tx beams and Rx beams may be considered. In one embodiment, in FIG. 5, it may be assumed that a number of Tx beams and a number of Rx beams are eight. However, the above assumption is an example, and it is not limited thereto. Herein, the base station may broadcast to devices a SS burst set before the UE transmits a first message in, a random access procedure. In one embodiment, in the broadcasted SSB burst set, a Tx beam of each base station transmitting an SSB on the basis of eight SSBs and an index of another SSB may be included. Herein, referring to an SSB transmission, the base station may continuously transmit eight SBs in a time domain through Tx beam switching. Herein, in one embodiment, referring to FIG. 5, a device A 510 may receive "S0" first. In addition, a device B 520 may receive "S1" later on the basis of beam switching. In other words, beams may be received in consideration of coverage of other beams different from each other.

Herein, in one embodiment, when directions of Tx beams of the base station exactly match with directions of Rx beams, SSB and RACH resource mapping may be as shown in FIG. 8. Herein, by the above mapping, the device may implicitly inform the base station a proper downlink Tx beam direction by using the RACH resource. In other words, when the device receives "S0", the device may transmit a first message by using the assigned RACH resource in a random access procedure for "S0". Accordingly, the base station may detect a preamble of the device, and determine a RACH resource used in a transmission of the first message. Accordingly, the base station may determine that the device is within coverage of a Tx/Rx beam 1. In other words, when a number of Tx beams and a number of Rx beams are identical, the device performs transmission of a first message on the basis of a received Tx beam, and thus the base station may determine a position of the device.

Figure 5:
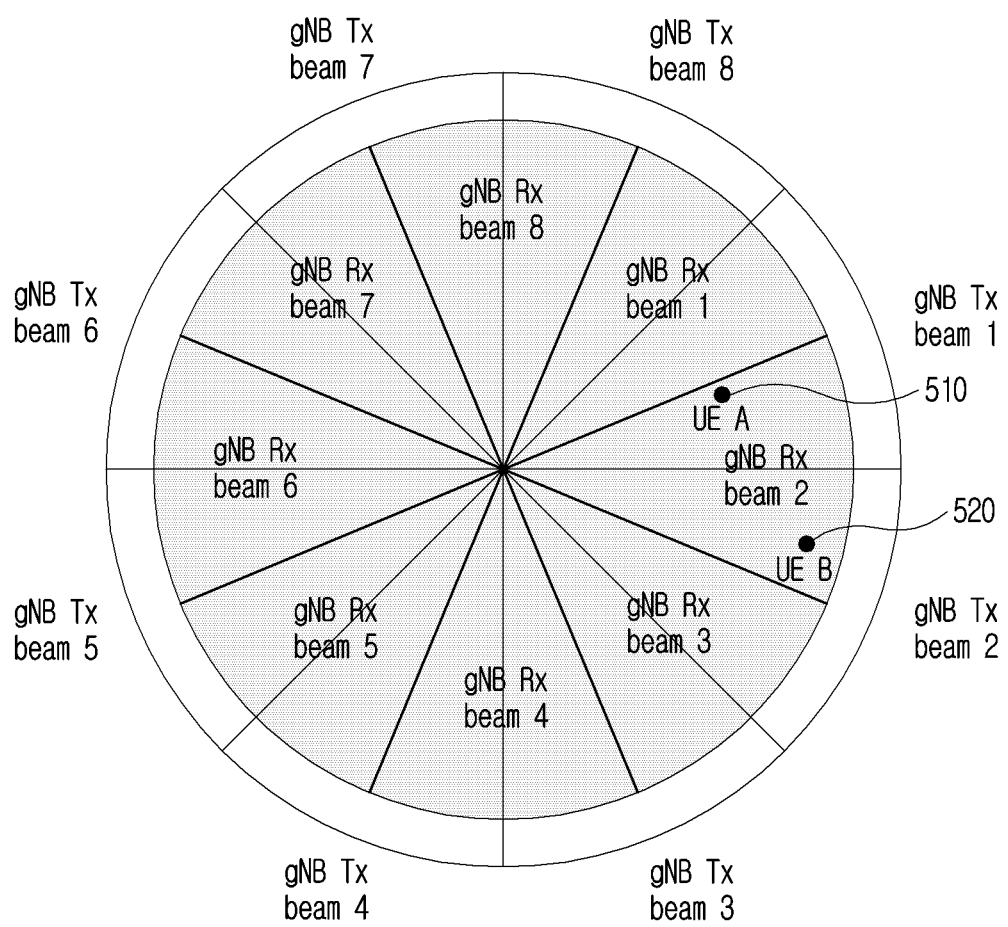
FIG. 5 is a view showing a case where a number of Tx beams and a number of Rx beams are identical.

Herein, in one embodiment, as shown in FIG. 5, when directions of Tx beams and Rx beams of the base station are not identical, the device may not inform a proper Tx beam on the basis of mapping of FIG. 8. Herein, considering the above case, informing may be performed on the basis of a method below.

Embodiment 1-1-1 (Alternative 1, Using the Same Preamble Sequence for SSBs Different From Each Other)

Considering the above case, first, the device may transmit a first message in a time domain by using a plurality of RACH resources. Herein, preamble sequences corresponding to SSBs different from each other may be identical. In other words, the same preamble sequence may be transmitted from SSBs different from each other. Herein, in terms of the base station, positions of RACH resources different from each other may be used for identifying SSBs different from each other. In other words, since the preambles are identical, each SSB may be identified on the basis of the position of the RACH resource.

Figure 9:
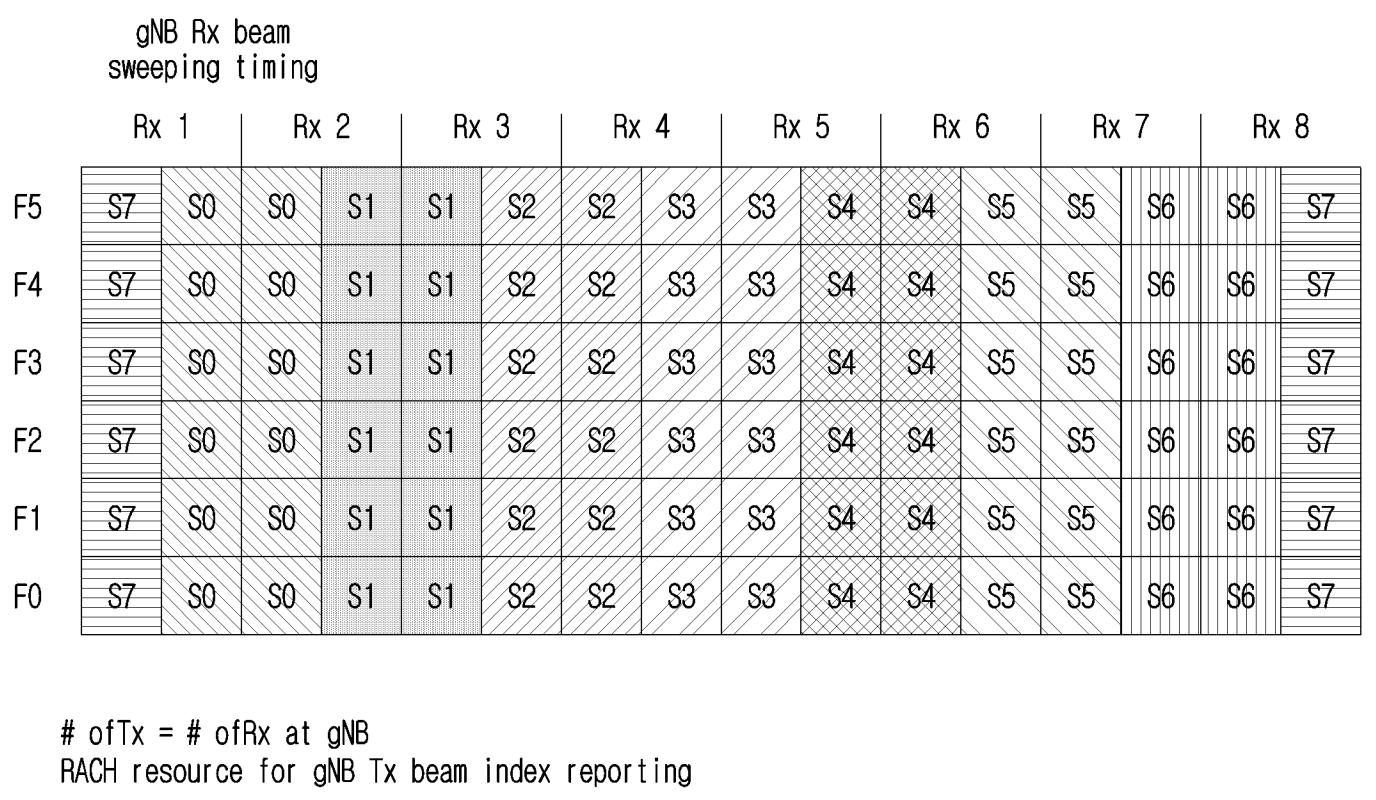

In one embodiment, referring to FIG. 9, based on the above description, SSB and RACH resource mapping may be considered. Herein, a plurality of RACH resources related to one SSB may be consecutively positioned in a time domain. Herein, preambles transmitted from the same device is received through neighbor Rx beams, and thus the base station may determine a proper downlink beam by using the RACH resources used for the device. In one embodiment, in case of FIG. 5, the device A 510 may transmit "S0" of FIG. 9 in first message by using two RACH resources. In addition, the device B 520 may transmit "S1" of FIG. 9 in a first message by using two RACH resources. Herein, when the base station performs Rx beam sweeping at a beam sweeping timing, the device may detect the first message of the device A 510 and the first message of the device B 520 in RACH resources different from each other by using an Rx beam 2. Accordingly, the base station may recognize a proper downlink beam of each device.

Embodiment 1-1-2 (Alternative 2, Using Different Preamble Sequences for SSBs Different from Each Other)

In another embodiment, the device may transmit a first message in a time domain by using a plurality of RACH resources. Herein, preamble sequences of SSBs different from each other may be different. In other words, preambles different from each other may be used for respective SSBs. Herein, preamble sequence groups may be assigned to groups different from each other. Herein, in terms of the base station, preamble sequence groups may be used for identifying SSBs different from each other.

In one embodiment, referring to FIG. 10, when SSB and RACH resource mapping is considered, a plurality of RACH resources may be consecutively assigned in a time domain in association with one SSB. Herein, in one embodiment, the device A 510 of FIG. 5 may transmit a first message by using two RACH resources for "S0" of FIG. 9. In addition, the device B 520 of FIG. 5 may transmit a first message by using two RACH resources for "S1". Herein, the base station may perform Rx beam sweeping at a beam sweeping timing shown in FIG. 10. Herein, a preamble of the device A 510 and a preamble of the device B 520 may be generated by using a sequence of sequence groups different from each other. Accordingly, the base station may detect the first message of the device A 510 and the first message of the device B 520 by using an Rx beam 2. Accordingly, the base station may recognize a proper downlink beam of each device.

In another embodiment, a plurality of RACH resources may be associated with the same SSB on the basis of an implementation method that is different for each base station. Herein, a plurality of RACH resources may be distributed and assigned in a time domain. In one embodiment consecutive RACH resources are as described above. Meanwhile, for the distributed and assigned RACH resource, the Alternative 1 and Alternative 2 described above may be applied, but it is not limited to the embodiment described above.

Herein, in one embodiment, comparing the Alternative 1 and Alternative 2 described above, in the Alternative 1, RACH resources may be assigned and used twice as much in a time domain. In one embodiment, in the Alternative 1, compared to Alternative 2, a delay of a random access procedure may occur on the basis of the above description. Meanwhile, in the Alternative 2, a RACH resource may be economized in a time domain. However, all usable preamble sequences have to be grouped, and assigned to SSBs different from each other, one RACH resource has to be used for two SSBs and thus an interference effect may be larger than the Alternative 1. Herein, in terms of the device, power consumption of the device may be smaller in the Alternative 1 than in the Alternative 2. In other words, in case of the Alternative 2, when interference levels different from each other may be considered for respective RACH resources, power consumption may be larger in terms of the device. Accordingly, one of the Alternative 1 and the Alternative 2 described above may be set in consideration of situation of the device and the base station, but it is not limited to the embodiment described above. In addition, information of the Alternative 1 and the Alternative 2 described above may be shared among devices by using at least one of system information, upper layer information, and L1/L2, but it is not limited to the embodiment described above.

Embodiment 1-2 (In Case of $N_{TX}>N_{RX}$)

Figure 6:
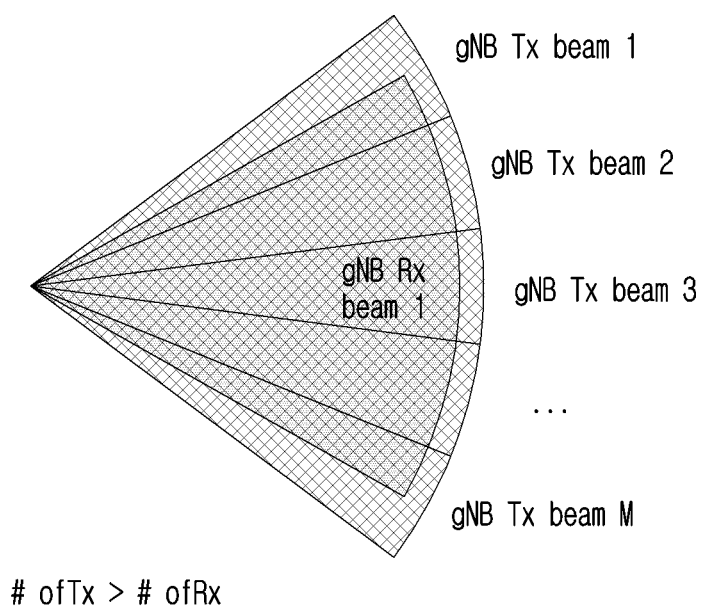
FIG. 6 is a view showing a case where a number Tx beams is larger than a number of Rx beams.

Referring to FIG. 6, in terms of the base station, a case where a number of Tx beams is larger than a number of Rx beams may be considered. In other words, a case of $N_{TX}>N_{RX}$ may be considered. Herein, SSB and RACH resource mapping may be as shown in FIG. 11. In one embodiment, when the same preamble sequence is used for SSBs different from each other as the Alternative 1 described above, resource mapping shown in FIG. 11 may be used. Accordingly, two adjacent RACH resources may be assigned for a Tx beam 1 and a Tx beam M, and one RACH resource may be assigned to other non-boundary Tx beams.

Figure 12:
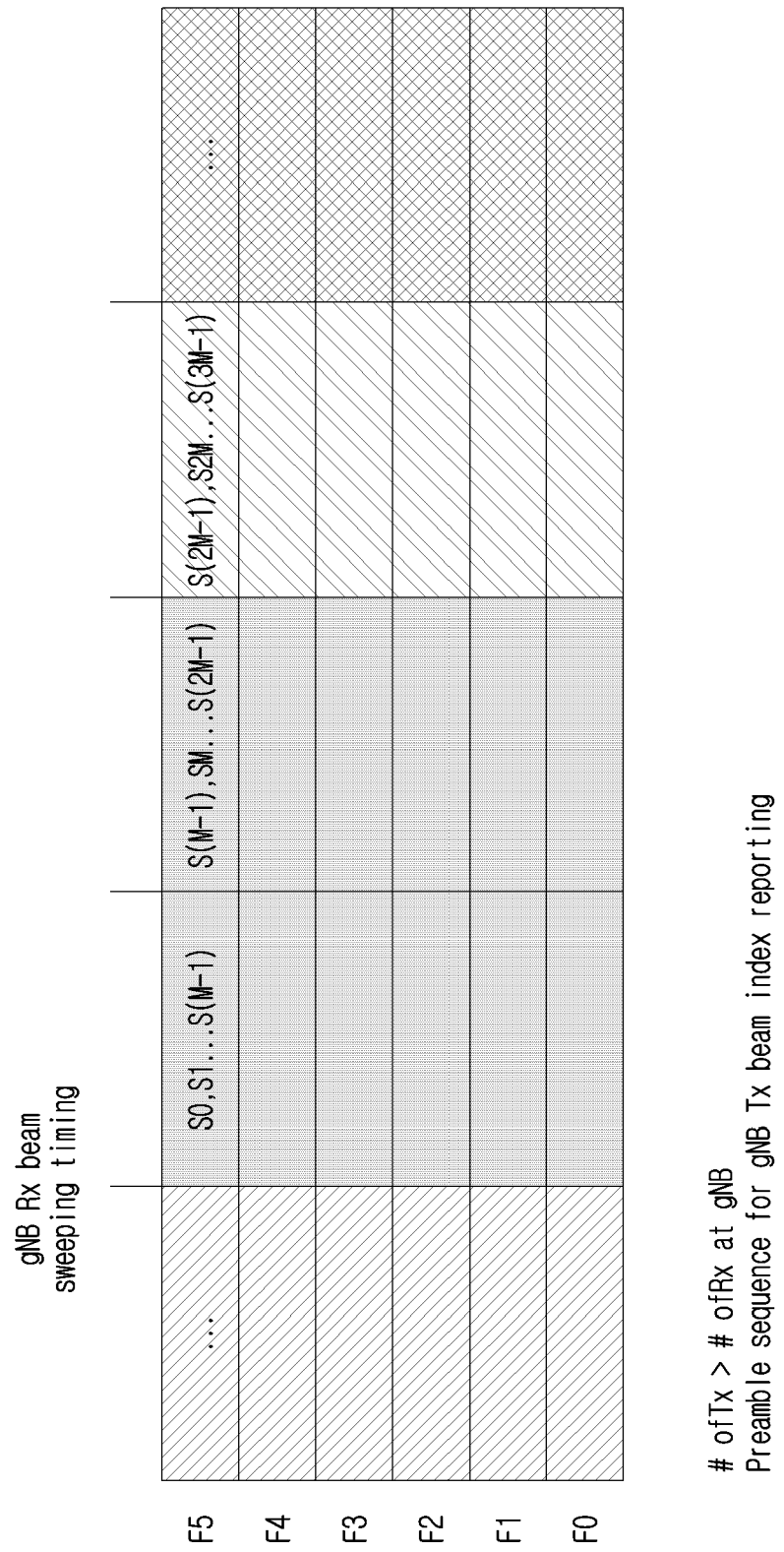
FIG. 12 is a view showing RACH resource mapping when a number of Tx beams is larger than a number of Rx beams.

In addition, in one embodiment, when preamble sequences different from each other are used for SSB as the Alternative 2 described above, resource mapping shown in FIG. 12 may be used. Herein, in order to solve a Tx-Rx beam miss-match problem, a Tx beam 1 and a Tx beam M may be assigned to two adjacent RACH resources as a boundary Tx beam.

Herein, in one embodiment, when setting RACH for devices, a case where a first message of each device is assigned to RACH resources may be considered. In one embodiment, as shown in FIG. 11 when a first message is assigned to respective RACH resources, a number of bits for RACH setting may increase. Herein, in an NR system remaining minimum system information (RMS) may include RACH configuration information, and RMSI of Tx beams of all base stations may be identical. Accordingly, considering a case of FIG. 11, when all pieces of resource mapping information are included in RMSI, RMSI may increase in burden. In other words, since boundary beams and non-boundary beams occupy RACH resources in numbers different from each other, a starting position of a RACH resource of each SSB may be set by using RMSI, and a length of the RACH resource of each SSB may be indicated. Accordingly, information to be include in RMSI may increase.

Herein, in one embodiment, in order to reduce the burden of RACH setting, the case of FIG. 11 may be changed as shown in FIG. 13. In more detail, in FIG. 13, regardless whether or not being a boundary beam or non-boundary beam, all SSBs may be transmitted by being assigned to two RACH resources. Comparing the case of FIG. 13 with the case of FIG. 11, a random access procedure may be delayed, and power consumption may increase when the device transmits a first message, but the burden of RACH setting may be reduced as described above.

Embodiment 1-3 (In Case of $N_{TX}<N_{RX}$)

Figure 7:
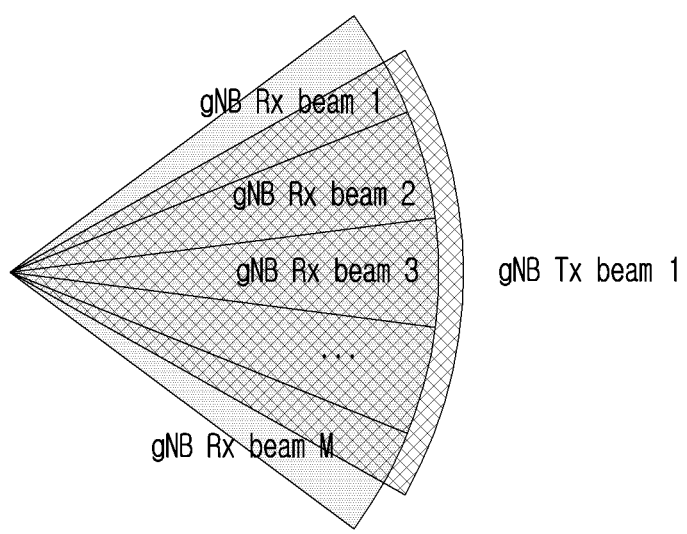
FIG. 7 is a view showing a case where a number of Tx beams is smaller than a number of Rx beams.

In another embodiment, as shown in FIG. 7, in terms of the base station, a case where a number of Tx beams is smaller than a number of Rx beams may be considered. Herein, considering the Alternative 1 described above, SSB and RACH resource mapping may be as shown in FIG. 14. Herein, in one embodiment, referring to FIG. 7, a boundary Rx beam may be an Rx beam 1 and an Rx beam M. Herein, in one embodiment, an Rx beam sweeping timing of a boundary Rx beam may vary from other non-boundary beams. Accordingly, two Tx beams crossing a boundary Rx beam of the base station is considered, and thus monitoring two RACH resources is required.

In addition, in one embodiment, in FIG. 15, SSB and RACH resource mapping in consideration of the Alternative 2 described above is shown. Herein, the base station may perform sweeping at the same Rx beam sweeping timing. Meanwhile, an RACH resource monitored by a boundary Rx beam may be assigned to two adjacent Tx beams.

Embodiment 1-4 (RACH Resource Setting in Consideration of Mapping Different From Each Other)

In terms of a network, when a carrier frequency is smaller than 6 GHz as Embodiment 1, the base station may provide to the device parameters of Table 1 below by including the same in RMSI. In other words, necessary pieces of information may be provided to the device in consideration of the Embodiments 1-1 to 1-3 described above.

TABLE 1

1. Starting point of a RACH resource in association with each SSB
2. Length of RACH resources which is assigned in a time domain in association with each SBB
3. Preamble sequence group in association with each SSB (if necessary)

Embodiment 2 (Case Where a Carrier Frequency Exceeds 6 Ghz, SSB to RACH Resource Association and RACH Setting Contents Related to the Same)

Considering a case where a carrier frequency exceeds 6 GHz, degree-of-freedom of a frequency domain (frequency domain duplexing of RACH resources) may be considered when designing SSB and RACH resource mapping. This is because, a larger number of beams may be considered in terms of the base station. In below, considering a case where a carrier frequency exceeds 6 GHz, as a mapping method, an Alternative 1 will be described, the Alternative 1 may consider conditions of Table 2.

TABLE 2

1. In a time domain, a plurality of RACH resources is assigned to an SSB M of one RACH resource carrier FX.
2. In a time domain, a plurality of RACH resources is assigned to an SSB M + 1 of an other RACH resource carrier FY.
3. In order to solve a Tx-Rx beam miss-matching problem in a time domain, the last one (or more than one) RACH resource for an SSB m is overlapped with the first of a plurality of RACH resources TABLE 2-continued for an SSB m + 1.
4. For sorting in a time domain, the last one (or more than one) RACH resource(s) is cyclically shifted.

In addition, in one embodiment, in a case where a carrier frequency exceeds 6 GHz, an Alternative 2 may be identical to the Alternative 2 of the case where a carrier frequency is smaller than 6 GHz of the Embodiment 1. In other words, for each FX, the same mapping method may be applied, but it is not limited to the embodiment described above.

Embodiment 2-1 (In Case of $N_{TX} \geq N_{RX}$)

Considering the Alternative 1 described above, RACH resources different from each other may be used for Tx beams of base stations different from each other. In one embodiment in FIG. 16, a case may be considered where the total number of transmitted SSBs is 24. However, the above case is an example, and it is not limited to the embodiment described above. Herein, in FIG. 16, SSB and RACH resource mapping of the above case is shown. In one embodiment, in the Alternative 1, in order to solve a Tx-Rx beam miss-matching problem, a case may be considered where mapping is performed by assigning two PRBs in a frequency domain. In one embodiment, referring to FIG. 16, two RACH resources for two of "S0" may be mapped "F0". In addition, two RACH resources for "S1" may be mapped to "F1". Herein, in a time domain, RACH resources for "S0" and "S1" may be overlapped in the second RACH resource. Herein the same RACH resource mapping method may be used as a mapping method for renaming SSBs.

Herein, in order to maintain RACH resources of PRB carriers different from each other which are sorted in a time domain cyclical shifting may be considered. In one embodiment, in FIG. 16, "L1", "L2", and "L3" may indicate three RACH candidate resources for "S7", "S15", and "S23". Herein, the base station includes three transmission/reception points (TRP) in a spatial domain, and a case may be considered where each TRP includes eight Tx beams. However, the above case is an example, and it is not limited to the embodiment described above. Herein, in one embodiment, a Tx beam 1 and a Tx beam 8 may be adjacent in a TRP 1. In addition, a Tx beam 9 and a Tx beam 16 may be adjacent in a TRP 2. In addition, a Tx beam 17 and a Tx beam 24 may be adjacent in a TRP 3. Accordingly, as shown in FIG. 17, "S7" may be mapped to "L1", "S15" may be mapped to "L2", and "S23" may be mapped to "L3". However, when the base station includes one TIS' in a spatial domain and a cast is considered where beams are 24, a Tx beam 24 and a Tx beam 1 may be adjacent. Herein, referring to FIG. 18, "S7" may be mapped to "L2", "S15" may be mapped to "L3", and "S23" may be mapped to "L1".

In addition, in one embodiment, in FIG. 19, a case is shown where 64 SSTs are transmitted, and association relations between all SSBs and RACH resources are shown. Herein, similar as described above, "S21", "S43", and "S63" may be mapped to RACH resources "L1", is "L2", and "L3" by cyclically shifting.

Embodiment 2-2 (In Case of $N_{TX} < N_{RX}$)

In addition, in one embodiment, a case may be considered where a number of Tx beams is smaller than a number of Rx beams as the case shown in FIG. 7. Herein, in one embodiment, a detailed mapping method may be as shown in FIGS. 20 and 21 on the basis of the Alternative 1 described above. Herein, referring to FIG. 20, RACH resources for one SSB may be mapped to one PEE in a frequency domain. Herein, the mapping method described above may decrease power consumption, of the device. In addition, the mapping method described above may be applied to the previous mapping method However, based on FIG. 20, empty RACH resources may be present. Accordingly, in FIG. 21, RACH resources for one SSB may be mapped, to two PRBs in a frequency domain. Thus, power consumption of the device may increase but frequency diversity may be ensured.

Embodiment 2-3 (RACH Resource Setting in Consideration of Mapping Different From Each Other)

In terms of a network, in case where a carrier frequency is smaller than 6 GHz as Embodiment 1, a base station may provide to a device parameters of Table 3 below by including the same in RMSI. In other words, necessary information may be provided to the device in consideration of Embodiments 2-1 and 2-2 described above.

TABLE 3

1. Starting point of a RACH resource in association with each SSB
2. Length of RACH resources which is assigned in a time domain in association with each SSB
3. Indicating RACH resource (transmission opportunity) carriers used for SSB mapping (if they are not a default value)

Figure 22:
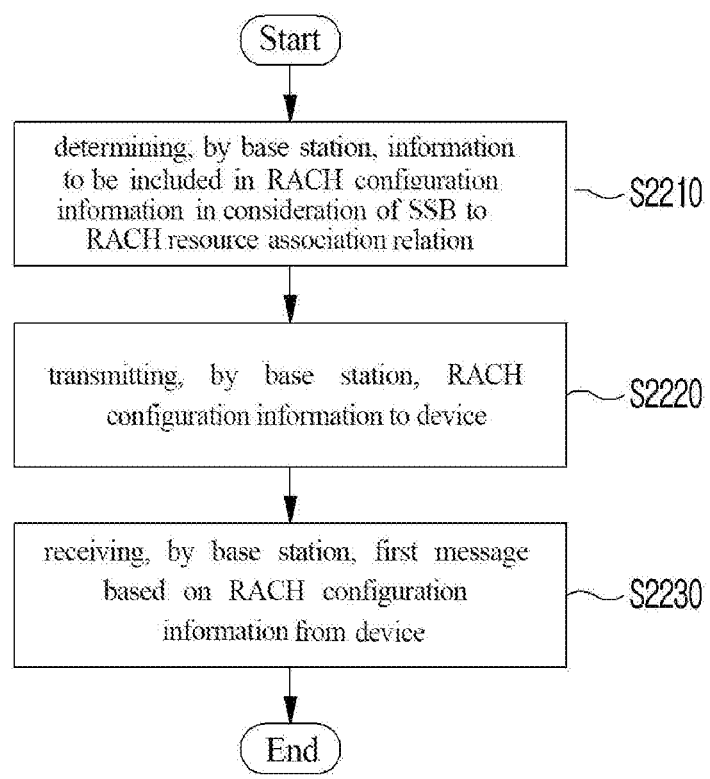
FIG. 22 is a view of a flowchart showing a method of performing a random access procedure.

FIG. 22 is a view of a flowchart showing a method of performing a random access procedure.

Referring to FIG. 22, in step S2210, the base station may determine information to be included in RACH configuration information in consideration of an SSB to RACH resource association relation. Herein, referring to FIGS. 1 to 21, an SSB and RACH resource association relation may be differently set when a carrier frequency is smaller than 6 GHz or exceeds 6 GHz. In addition, in one embodiment, a preamble in association with an SSB may be identically set for SSBs, or variably set for each SSB. Herein, an SSB and RACH resource association relation may be set in consideration of the above feature. In addition, in terms of the base station, an SSB and RACH resource association relation may be differently set on the basis of a number of Tx beams and a number of Rx beams, and this is as described above. In one embodiment, in consideration of an SSB and RACH resource association relation which is described above, RACH configuration information may be determined.

Then, in step S2220, the base station may transmit to the device RACH configuration information. Herein, in one embodiment, the base station may determine information to be included in RACH configuration information on the basis of the above description, and notify the device of the information. Herein, in one embodiment, the base station may notify the device the above information through RMSI.

Then, in step S2330, the device may transmit a first message in a random access procedure on the basis of the received RACH configuration information. Herein, as described with reference to FIGS. 1 to 21, a preamble for performing a random access procedure may be included in the first message. Herein, the preamble may correspond to an SSB. The same preamble may be set for all SSBs, or preambles different from each other may be set for respective SSBs, and this is as described above. Herein, in one embodiment, as described above, when a multi-beam system is considered, a plurality of SSBs may be present in consideration of beam sweeping, and SSB and RACH resource mapping may be considered for performing a random access procedure.

Figure 23:
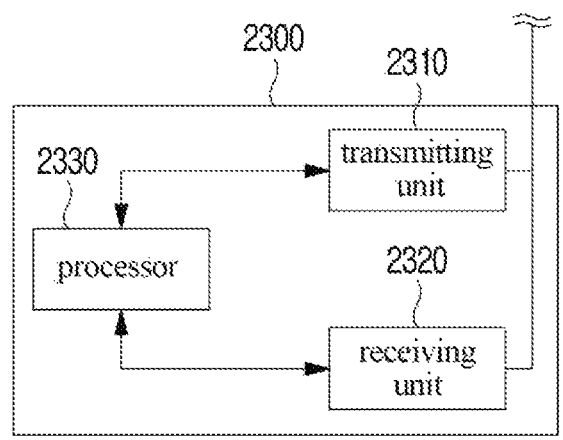
FIG. 23 is a view showing an apparatus of the present disclosure.

FIG. 23 is a view showing an apparatus of the present disclosure.

An apparatus 2300 may include a transmitting unit 2310 transmitting a radio signal, a receiving unit 2320 receiving a radio signal, and a processor 2330 controlling the transmitting unit 2310 and the receiving unit 2320. Herein, the apparatus 2300 may perform communication with an external device by using the transmitting unit 2310 and the receiving unit 2320. Herein, in one embodiment, the apparatus may be a device, a base station, or another device performing communication. In addition, the external device may be another device, a base station or another device performing communication, but it is not limited to the embodiment described above. In other words, downlink, uplink, and sidelink transmission may be performed, but it is not limited to the embodiment described above.

In addition, the apparatus of the present disclosure described above is a mobile device and is not limited to a smartphone. In one embodiment, the apparatus may be any one of a drone, a vehicle, an IoT device, and other device. In other words, the apparatus may be an apparatus performing communication, may be an apparatus to which the present disclosure described above is applied, and it is not limited to the embodiment described above.

The embodiments of the present disclosure can be implemented by a variety of means, for example, hardware, firmware, software, or a combination thereof.

As mentioned in the foregoing description, the detailed descriptions for the preferred embodiments of the present disclosure are provided to be implemented by those skilled in the art. While the present disclosure has been described and illustrated herein with reference to the preferred embodiments thereof, it will be apparent to those skilled in the art that various modifications and variations can be made therein without departing from the spirit and scope of the disclosure. Therefore, the present disclosure is non-limited by the embodiments disclosed herein but intends to give a broadest scope matching the principles and new features disclosed herein In addition, while the inventive concept has been particularly shown and described with reference to exemplary embodiments thereof, it will be understood by those of ordinary skill in the art that various changes in form and details may be made therein without departing from the spirit and scope of the inventive concept as defined by the following claims Also, a device disclosure and a method invention are both described in this specification.

In addition, while several exemplary embodiments have been particularly shown and described, it will be understood by those of ordinary skill in the art that various changes in form and details may be made therein without departing from the spirit and scope of the present disclosure as defined by the following claims.

What is claimed is:

1. A method of performing a random access procedure, wherein a device performs a random access procedure in a radio communication system, the method comprising:
   receiving random access channel (RACH) configuration information from a base station; and
   transmitting message 1 including a preamble to the base station using one or more RACH resources indicated by the received RACH configuration information,
   wherein a plurality of synchronization signal blocks (SSBs) are respectively in association with a plurality of preambles which are identical, and
   wherein when a number of Tx beams and a number of Rx beams of the base station are identical, the message 1 in association with one SSB is transmitted in two consecutive RACH resources.

2. The method of claim 1, wherein the plurality of SSBs are identified based on a position of each of the one or more RACH resources.

3. The method of claim 1, wherein when the number of Tx beams is larger than the number of Rx beams, the message 1 in association with a boundary Tx beam is transmitted in two consecutive RACH resources, and the message 1 in association with non-boundary Tx beam is transmitted in one RACH resource.

4. The method of claim 1, wherein when the number of Tx beams is smaller than the number of Rx beams, a beam sweeping timing of a boundary Rx beam and a beam sweeping timing of non-boundary Rx beam are differently set.

5. The method of claim 1, wherein the random access procedure is applied to a frequency smaller than 6 GHz.

6. A method of performing a random access procedure, wherein a device performs a random access procedure in a radio communication system, the method comprising:
   receiving random access channel (RACH) configuration information from a base station; and
   transmitting message 1 including a plurality of preambles to the base station using one or more RACH resources indicated by the received RACH configuration information,
   wherein a plurality of synchronization signal blocks (SSBs) are respectively in association with the plurality of preambles which are different, and
   wherein when a number of Tx beams and a number of Rx beams of the base station are identical, the message 1 is transmitted in one RACH resource.

7. The method of claim 6, wherein the plurality of SSBs are respectively identified based on the plurality of preambles.

8. The method of claim 6, wherein when the number of Tx beams is larger than the number of Rx beams, the message 1 of an SSB in association with a boundary Tx beam is transmitted in two consecutive RACH resources, and the message 1 of an SSB in association with non-boundary Tx beam is transmitted in one RACH resource.

9. The method of claim 6, wherein when the number of Tx beams is smaller than the number of Rx beams, the message 1 in association with an SSB monitored by a boundary Rx beam is transmitted in two consecutive RACH resources.

10. A method of performing a random access procedure, wherein a base station performs a random access procedure in a radio communication system, the method comprising:
    determining information to be included in random access channel (RACH) configuration information in consideration of a synchronization signal block (SSB) and RACH resource association relation;
    transmitting the RACH configuration information to a device; and
    receiving from the device message 1 in one or more RACH resources indicated by the RACH configuration information,
    wherein a plurality of SSBs are respectively in association with a plurality of preambles which are identical, and
    wherein when a number of Tx beams and a number of Rx beams of the base station are identical, the message 1 in association with one SSB is transmitted in two consecutive RACH resources.

11. The method of claim 10, wherein the plurality of SSBs are identified by respective positions of each of the one or more RACH resources.

12. The method of claim 10, wherein when the number of Tx beams is larger than the number of Rx beams, the message 1 of an SSB in association with a boundary Tx beam is transmitted in two consecutive RACH resources, and the message 1 of an SSB in association with non-boundary Tx beam is transmitted in one RACH resource.

13. The method of claim 10, wherein when the number of Tx beams is smaller than the number of Rx beams, a beam sweeping timing of a boundary Rx beam and a beam sweeping timing of non-boundary Rx beam are differently set.

14. A method of performing a random access procedure, wherein a base station performs a random access procedure in a radio communication system, the method comprising:
 determining information to be included in random access channel (RACH) configuration information in consideration of a synchronization signal block (SSB) and RACH resource association relation;
 transmitting the RACH configuration information to a device; and
 receiving from the device a message 1 in one or more RACH resources indicated by the RACH configuration information,
 wherein a plurality of SSBs are respectively in association with a plurality of preambles different from each other,
 wherein when a number of Tx beams and a number of Rx beams of the base station are identical, the message 1 including the plurality of preambles is transmitted in one RACH resource.

15. The method of claim 14, wherein the plurality of SSBs are respectively identified based on the plurality of preambles.

16. The method of claim 14, wherein when the number of Tx beams is larger than the number of Rx beams, the message 1 of an SSB in association with a boundary Tx beam is transmitted in two consecutive RACH resources, and the message 1 of an SSB in association with non-boundary Tx beam is transmitted in one RACH resource.

17. The method of claim 14, wherein the number of Tx beams is smaller than the number of Rx beams, the message 1 in association with an SSB monitored by a boundary Rx beam is transmitted in two consecutive RACH resources.

* * * * *